Figure 1:
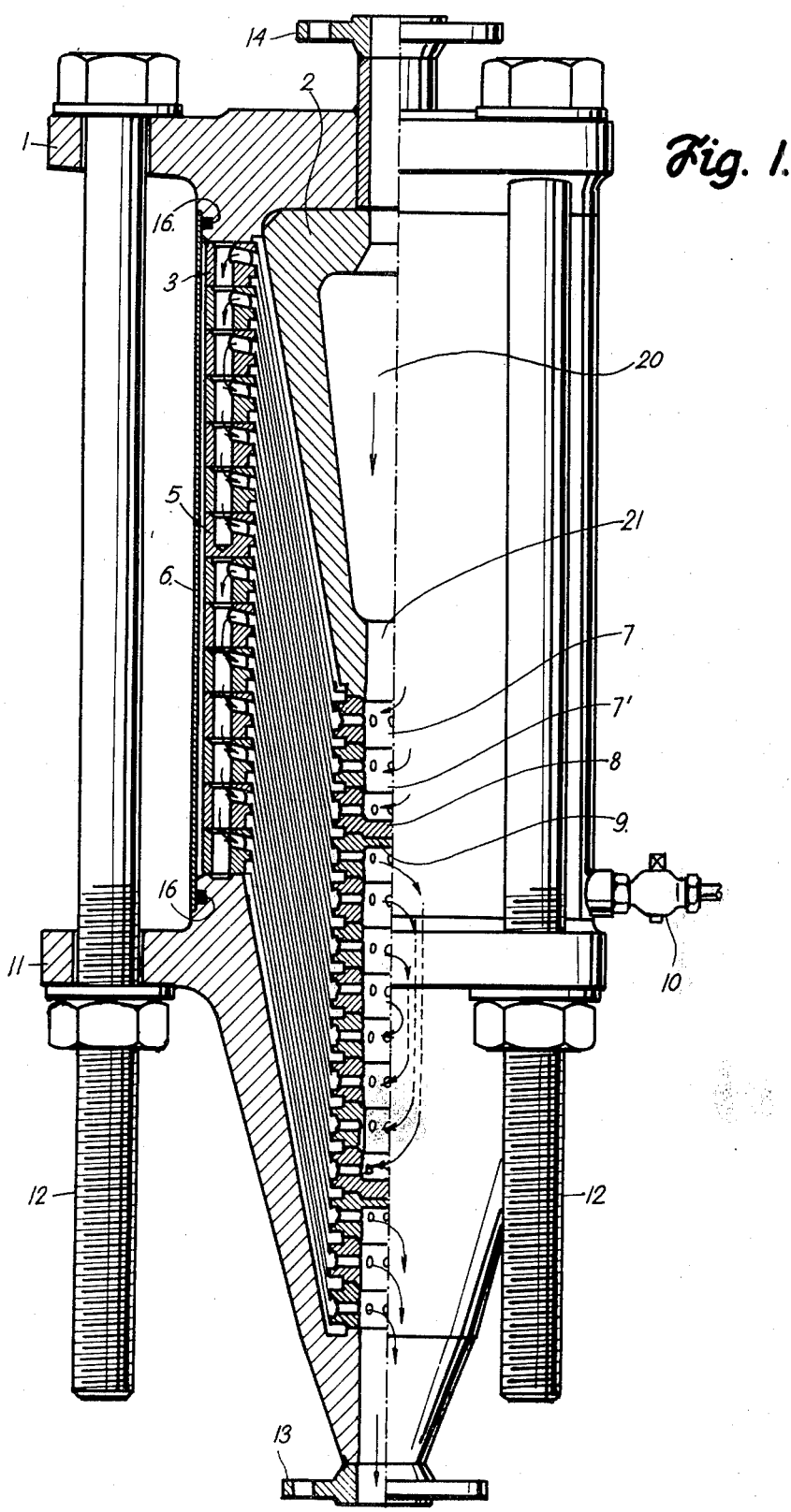

United States Patent [19]

Skrabak et al.

[11] 3,969,241

[45] July 13, 1976

[54] METHOD OF AND APPARATUS FOR SEPARATING CHEMICAL SOLUTIONS IN MEMBRANE PROCESSES

[75] Inventors: Michal Skrabak; Ernest Vavrik; Stanislav Kolarik; Milos Mazak, all of Bratislava, Czechoslovakia

[73] Assignee: Slovenska Vysoka Skola Technicka, Bratislava, Czechoslovakia

[22] Filed: July 29, 1974

[21] Appl. No.: 492,407

[52] U.S. Cl. .................. 210/23 H; 204/180 P; 210/23 F; 210/336; 210/337; 210/433 M
[51] Int. Cl.² ................................. B01D 31/00
[58] Field of Search .......... 210/433, 321, 336, 337, 210/23; 204/301, 296, 180 P

[56] References Cited
UNITED STATES PATENTS

| | | |
|---|---|---|
| 3,469,702 | 9/1969 | Perren .......................... 210/336 X |
| 3,488,768 | 1/1970 | Rigopulos ........................... 210/23 |
| 3,491,021 | 1/1970 | Huntington ..................... 210/321 X |
| 3,795,317 | 3/1974 | Van Zon ........................ 210/336 X |

Primary Examiner—Frank A. Spear, Jr.
Attorney, Agent, or Firm—Burgess Ryan and Wayne

[57] ABSTRACT

Method of carrying out filtration using semipermeable membranes in apparatus of the type having a plurality of frustoconical sections defining an annular type space between the various sections, each section having a membrane thereon, the steps comprising passing a solution to be treated along the spaces between the various sections in converging and/or diverging flow paths.

3 Claims, 2 Drawing Figures

METHOD OF AND APPARATUS FOR SEPARATING CHEMICAL SOLUTIONS IN MEMBRANE PROCESSES

The present invention relates to a novel method and apparatus of utilizing semipermeable membranes in so-called membrane processes, i.e., processes commonly known as osmosis, ultrafiltration, electrodialysis, etc. For carrying out the aforementioned method in accordance with the present invention, an improved module construction has been proposed, comprising a plurality of frustoconical membrane carriers coaxially received in each other and covered at either side with semipermeable membranes so as to form ducts designed to guide a convergent or divergent flow of liquid substance through narrow spacings which are adjustable by means of spacing collars.

The method and apparatus according to the invention solve one of the basic problems encountered in constructing modules for high-pressure membrane processes. The novel method and apparatus of the present invention make it possible to attain substantially better hydrodynamic conditions, improve the effectiveness of the membrane processes, and reduce the floor space required for module assemblies. Among the merits brought about by this new method and apparatus are versatility and adaptability of the module to the desired technological conditions.

Since the through-flow cross section between the membranes permanently varies in downstream liquid flow direction, depending upon whether the respective chemical solution follows a convergent or divergent course, the construction according to the invention favourably influences the degradation of fine polarizing concentrating layers arising on the membrane surface and impairing the afore-mentioned membrane processes in that they considerably reduce the permeability of membranes or even prevent the solution to be separated from penetrating therefore at all. The particular module stages are formed each with one frustoconical carrier, one outer and one inner collar, and are identical both in shape and dimension. This enables the modules of various outputs to be assembled from like units. Due to the use of specially designed spacing collars, it is possible to variously combine the stages in one and the same module, which means that the liquid substance flows through the stages either in parallel or in series, or in combination, depending upon which mode is more suitable for the given membrane process. A variation in the module assembly can be accomplished by merely rearranging specially designed outer and inner spacing collars without using any additional elements. Since the module can be easily dismantled, it is possible to insert between the individual stages, which can be membrane carriers for instance, various so-called turbulence elements to achieve optimum characteristics and flow regime of the solution to be separated through the module. Thus optimum output can be obtained, i.e., the module permeability for the solution component to be separated can be increased. The afore-said insert can be variously combined in one and the same module, which is impossible with well-known types thereof.

Heretofore, no one module construction has been known which would possess the afore-mentioned advantageous features. In contradistinction to well-known coil-type modules, the module according to the present invention has several important advantages consiting, above all, in that, in case of a failure of a membrane, the respective module stage can be easily replaced by another one whereas with said coil-type module it is necessary to exchange the whole module assembly. Thus any repair work can be effected by the operator himself whereas with the coil-type modules, in view of the complicated nature and difficult adjustment thereof, particularly sealing, any repair without a skilled serviceman is out of the question. This holds also for the case of tubular or like module constructions.

Inasmuch as no special appliances are required for dismantling and reassembling the conical modules, they can be, unlike the modules of other types, easily and safely cleaned without any servicemen's assistance, and their membrane can be replaced by other ones, dependng upon the desired technological properties and membrane parameters.

From an economical point of view, this means that the operation of conical modules is more advantageous than that of other module types. Apart from this, when compared with other module types, the conical module is characterized by lower power consumption, since due to its constructional arrangement and the characteristics of its through-flow ducts, it is exposed to reduced hydro-dynamic resistances.

In order to eliminate or at least mitigate the drawbacks of prior art as hereinabove set forth, I provide a method of separating chemical solutions in membrane processes, such as reverse osmosis, ultrafiltration, electrodialysis and the like, which method, according to the invention, consists in that a chemical solution is caused to flow through narrow annular ducts defined by a system of coaxial and concentrically disposed thin-walled cones made of a porous material, both inner and outer conical surfaces of said cones being coated with semipermeable membranes.

The solution to be separated can be passed by the semipermeable membranes wither in a divergent or a convergent course, which means that the through-flow cross section of the space between two adjacent membranes increases or decreases, respectively, in the downstream direction of the liquid flow.

The liquid flow courses may also alternate while the frequency of said alternations is determined by the particular technological process to be performed.

Figure 2:
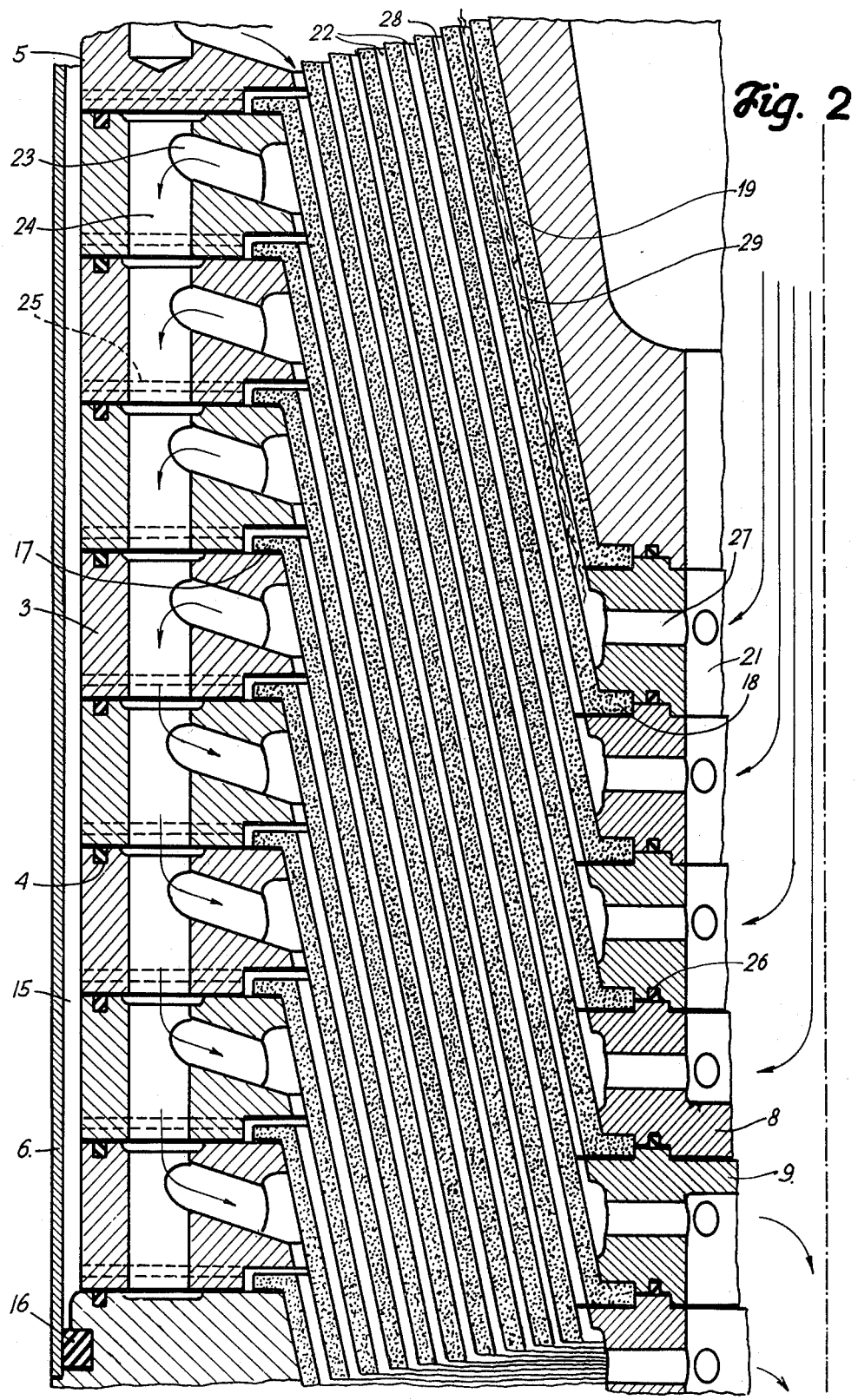

In order that the invention be better understood and carried into practice a preferred embodiment thereof will be now described with reference to the accompanying schematic drawing in which:

FIG. 1 is a total front view, partially in axial section, of the liquid separating membrane module according to the invention; and Fig. 2 is an enlarged detail view of a part of the module shown in FIG. 1.

As can be seen in the drawing, the conical module comprises an inlet front portion 1 provided with an inflow gate 14 and an outlet front portion 11 provided with a discharge port 13. The two portions 1 and 11 are received in a jacket 6 sealed at both ends by gaskets 16. Between the two front portions 1 and 11 there are gripped, e.g. by means of bolts 12, outer distributing spacing collars 3 and 5 in which flanges 17 of conical carriers 19 are located. Between the front portions 1 and 11 there are also gripped, by means of a conical support 2, inner distributing spacing collars 7, 8 and 9 between which flanges 18 of the carriers 19 are arranged. Membranes 22 cover overall both outer and inner surface of the carriers 19 together with the flanges 17 and 18 so that they are, together with said flanges, gripped between the outer and the inner distributing spacings collars whereby the membranes 22 are duly sealed on the carriers 19 as well as on the distributing spacing collars 7, 8, 9, 5 and 3.

A liquid substance, i.e., the solution to be subject to a separating process, flows into the inflow gate 14, fill up space 20 and flows therefrom into an inner space 21 defined by the inner distributing spacing collars 7, 7', 7'' and 8. Further the solution flows via a system of ducts 27 into a space 28 between the membranes 22 and therefrom into collecting channels 23 provided in the outer distributing spacing collars 3 and 5. From said collecting channels 23 the solution enters connecting channels 24 through which it is conveyed to other module stages.

At the level of the flanges 17 of the carriers 19 there is formed in the outer distributing spacing collars 3 and 5, channels 25 for withdrawing the solution component, which has penetrated the membranes, the so-called permeate, from the carriers 19 into a space 15 formed just under the wall of the outer jacket 6. From said space 15 the permeate is discharged over a valve 10 from the module for further processing. In view of the relatively low pressure of the permeate, the jacket 6 need not be designed as a pressure vessel.

The connecting channel 24 can be blocked at a selected place along its cross section by specially modified collar 5, similarly as the inner space can be blocked by specially modified collars 8 and 9. Due to this interruption of channel cross section, a change in liquid flow direction through the module is achieved. Thus, for example, an originally divergent flow in the stages fed over the inner distributing spacing collars 7, 7', 7'' and 8 is changed, due to the liquid flow deflection through the connecting channel 24, into the convergent flow in the next module stages, and so forth, as apparent from FIGS. 1 and 2 wherein the liquid flow direction is indicated by arrows. After the liquid substance has flowed through all the module stages, it is discharged therefrom through the discharge port 13 for further processing.

Between the adjacent module stages, turbulence elements 29 can be freely inserted. Any axial movement of said elements 29 is reduced or even prevented by the respective outer and inner distributing spacing collars.

The individual outer and inner distributing spacing collars 3, 5, 7, 8 and 9 are sealed relative to each other and to the front portions 1 and 11 by means of gaskets 4 and 26. These gaskets 4 and 26, however, can be omitted if all the respective surfaces of the module have a very smooth mechanical finish.

As results from the foregoing description, the surfaces of the specially modified collars 5, 8 and 9 determine the flow conditions of the liquid substance, i.e., a chemical solution, in the module; otherwise, the positions of said collars are not predetermined by anything and may be varied freely in one and the same module.

What is claimed is:

1. A method of separating chemical solutions in membrane processes of the type including reverse osmosis, ultrafiltration and electrodialysis, comprising flowing the solution serially through a plurality of nested frustoconical membrane-lined ducts whereby the solution flows alternately outwardly and inwardly through adjacent ducts, and separating components from said solution through the membrane lining of each duct.

2. The method of claim 1, in which said membrane-covered ducts are formed of frustoconical membrane carriers, having membranes on their frustoconical surfaces, wherein said step of flowing comprises flowing said solution in contact with the membranes on each side of said carrier 3. The method of claim 2, wherein said step of separating comprises withdrawing components from the outer edge of said carrier.

* * * * *